UNITED STATES PATENT OFFICE.

CARL BOSCH, OF LUDWIGSHAFEN-ON-THE-RHINE, GERMANY, ASSIGNOR TO BADISCHE ANILIN & SODA FABRIK, OF LUDWIGSHAFEN-ON-THE-RHINE, GERMANY, A CORPORATION OF GERMANY.

PRODUCTION OF CYANOGEN COMPOUNDS.

No. 821,457.　　　　Specification of Letters Patent.　　　Patented May 22, 1906.

Application filed April 1, 1905. Serial No. 253,318.

*To all whom it may concern:*

Be it known that I, CARL BOSCH, a subject of the King of Prussia, German Emperor, residing at Ludwigshafen-on-the-Rhine, in the Kingdom of Bavaria, German Empire, have invented new and useful Improvements in the Production of Cyanogen Compounds, of which the following is a specification.

The preparation of technically-pure cyanogen compounds from raw melts as hitherto practiced leaves much to be desired as regards the yields obtained, and the alkali employed in the preparation is usually obtained in a form which requires special treatment before it can be reused.

The object of my invention is to overcome these objections and obtain excellent yields of technically-pure cyanogen compounds.

According to my invention, water and an ammonium salt are added to the raw melt and the mixture is distilled, ammonium cyanid passing over, the yield being almost quantitative. Any suitable ammonium salt may be used; but I prefer to use one which will convert the base of the raw melt into a form in which it can be directly employed again in the production of fresh raw melts. The employment of ammonium carbonate offers a special advantage, because carbonic-acid gas, even in a dilute form, can be easily converted into ammonium carbonate, and thus be used indirectly for setting free the hydrocyanic acid from the raw melt, and this is an improvement upon driving off the hydrocyanic acid from the raw melt by heating with mineral acid.

It is preferable that the distillate containing ammonium cyanid be worked up without delay, and this can be effected by the addition either of acid or alkali.

In the process according to my invention sulfur compounds contained in the raw melt form ammonium sulfid, which distils over with the ammonium cyanid without forming sulfocyanid compounds, and this ammonium sulfid, and also any free sulfur, can be easily removed by bringing the gases into contact with a suitable salt of the heavy metals, either in the solid form or in solution or as a paste.

The process according to my invention is preferably carried out *in vacuo* with a condensing column above the distilling vessel, because then a concentrated distillate is obtained, the poisonous gases do not escape from the apparatus, and the distillation can be carried out at a lower temperature, thereby decreasing the liability to saponification of the hydrocyanic acid into formic acid.

The process according to my invention is especially useful when the raw cyanids of the alkaline-earth metals and ammonium carbonate are used, as then the alkaline-earth carbonates are obtained as by-products and can be directly used over again in a subsequent operation, while ammonium carbonate does not pass over with the distillate when distilling in the presence of water as it does in dry distillation.

The following examples will serve to further illustrate the nature of my invention, which, however, is not confined to these examples. The parts are by weight.

Example 1: Dissolve in water one hundred and twenty-five (125) parts of potassium-cyanid melt, (containing about seventy-six (76) per cent. of potassium cyanid and twenty-four (24) per cent. of potassium cyanate. Add to the solution ninety (90) parts of ammonium chlorid and then distil, collecting the distillate in an equivalent quantity of caustic-soda solution, which is maintained at a temperature of about forty (40°) degrees centigrade. When the gases being distilled over contain no more hydrocyanic acid, the distillation is stopped and the sodium-cyanid solution obtained is evaporated (preferably *in vacuo*) and the ammonia which is liberated can be collected.

Example 2: Stir with eight (8) parts of water one (1) part of raw barium cyanid, for instance, such as is obtained by Margueritte and Sourdeval's process. Pass carbonic-acid gas into the mixture until the barium hydrate contained therein is neutralized and then add a solution of ammonium carbonate in quantity equivalent to the amount of cyanogen obtained. After stirring for a short time distil *in vacuo* and continue heating until all the ammonium cyanid has distilled over. Collect the distillate in a solution of caustic soda which contains so much of the alkali that at the end of the operation a solution of practically pure sodium cyanid is obtained. This solution can be worked up as described in the foregoing Example 1.

If desired, the ammonium cyanid which distils over can be passed into acid, and the hydrocyanic acid which is set free can be collected and worked up in any suitable manner.

Now what I claim is—

1. The process for the production of technically-pure cyanogen compounds which consists in distilling crude cyanid melts with an ammonium salt in the presence of water.

2. The process for the production of technically-pure cyanogen compounds which consists in distilling in a vacuum crude cyanid melts with an ammonium salt in the presence of water.

3. The process for the production of technically-pure alkali cyanid which consists in distilling in a vacuum crude cyanid melts with an ammonium salt in the presence of water and treating the ammonium cyanid which distils over with caustic alkali.

4. The process for the production of technically-pure sodium cyanid which consists in heating in a vacuum crude cyanid melts with an ammonium salt in the presence of water and treating the ammonium cyanid which distils over with caustic soda.

In testimony whereof I have hereunto set my hand in the presence of two subscribing witnesses.

CARL BOSCH.

Witnesses:
J. ALEC. LLOYD,
JOS. H. LEUTE.